(No Model.)
G. W. BROWNE & C. R. TURNER.
FIFTH WHEEL.
No. 355,376. Patented Jan. 4, 1887.
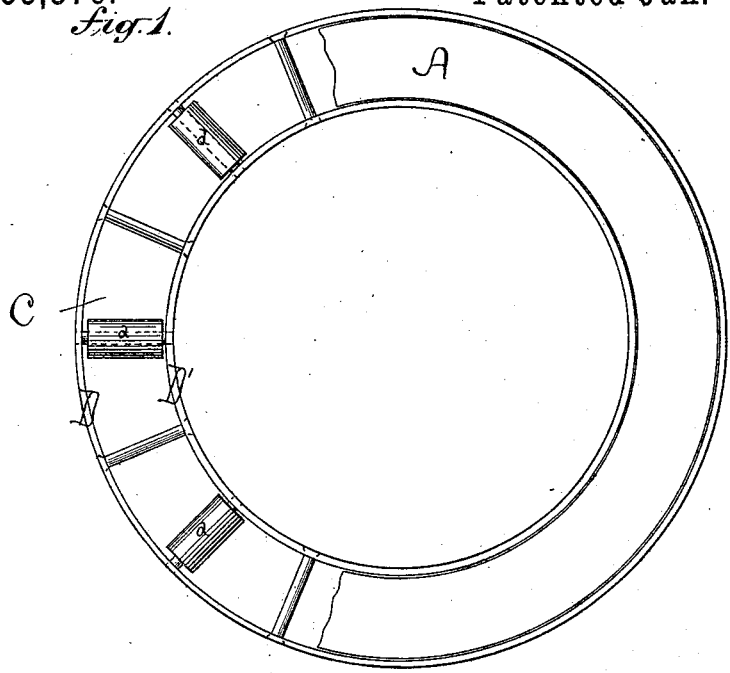
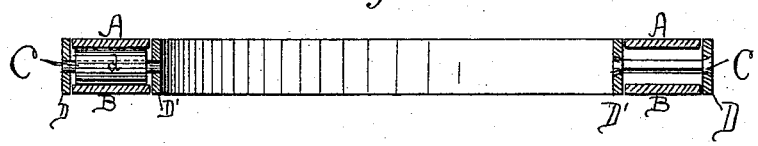
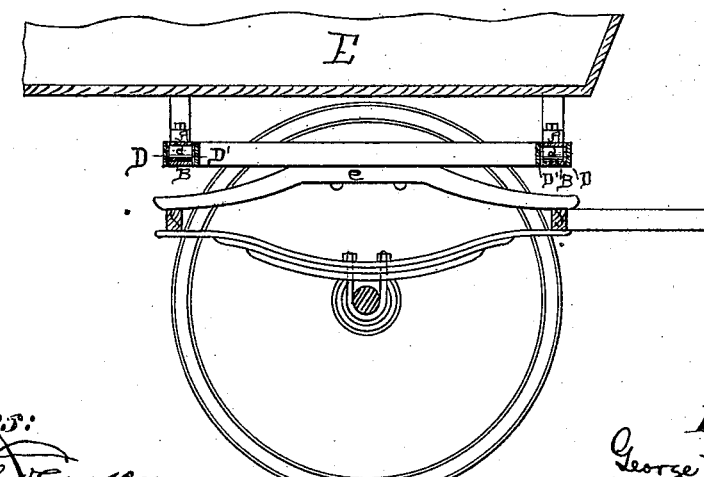
Witnesses:
Inventors
George W. Browne
and Caleb R. Turner
by Chas. R. Clarke, Atty

UNITED STATES PATENT OFFICE.

GEORGE W. BROWNE AND CALEB R. TURNER, OF BROOKLYN, ASSIGNORS TO THE NEW YORK FIFTH WHEEL COMPANY, OF NEW YORK, N. Y.

FIFTH-WHEEL.

SPECIFICATION forming part of Letters Patent No. 355,376, dated January 4, 1887.

Application filed August 30, 1886. Serial No. 212,160. (No model.)

*To all whom it may concern:*

Be it known that we, GEORGE W. BROWNE and CALEB R. TURNER, both of the city of Brooklyn, in the county of Kings and State of New York, are the inventors of an Improvement in Fifth-Wheels for Vehicles, of which the following is a specification, reference being had to the accompanying drawings, forming part of the same, in which—

Figure 1 is a plan view of a fifth-wheel containing our improvement, a section of the upper plate being broken away. Fig. 2 is a sectional view of Fig. 1. Fig. 3 is a sectional elevation of a vehicle with our improved fifth-wheel attached to it.

The object of our invention is to reduce the friction which is had in fifth-wheels of the ordinary construction; and it consists in placing between the usual upper and lower plates a frame provided with rollers which work between the bearing-surfaces of said plates, and held therein by means of the peculiar construction of the frame.

In the drawings, A is the upper portion or plate of a fifth-wheel, and B the lower. These plates or rings are of the ordinary style, having flat surfaces, and are attached, respectively, to the upper and lower gear of a vehicle in the usual manner.

C is a frame introduced between the plates A B, and having secured in it at intervals the rollers $d$, which rollers have their bearings in the side rims or flanges, D D', of the frame C. These side rims, D D', are made of any suitable metal, their upper and lower edges extending above and below the rollers $d$, thereby forming spaces or receptacles, into which the plates A B set, the former riding upon the rollers $d$ and the latter supporting them.

E is the box of a vehicle, to which the plate A is attached. $e$ $e$ are the cross-pieces of a vehicle, to which is attached the plate B.

It will be seen that by the construction of the central frame, C, a space is left above the rollers $d$ between the rims or flanges D D'. Into this space is placed the plate A, which is of a width a little less than that of the space, so that it works therein without much friction. The upper edges of the rims or flanges D D' should be of a height sufficient to come flush with the upper side of plate A.

As the rims or flanges D D' extend downward below the rollers $d$ a space, the same as that above the rollers, is formed, and in this space the plate B operates, supporting the rollers, which in turn support the plate A. The frame C is not secured in any manner to the king-pin of the vehicle, it being held securely in position by the action of the rims or flanges D D' against the sides or edges of the plates A B. The entire weight of the forward part of the vehicle, by means of the plate A, rests upon the rollers $d$, and as they in turn press upon the plate B, it will readily be seen that as either plate is turned by the action of the vehicle in cramping, the rollers revolve necessarily, thus forming a fifth-wheel in which the friction is reduced to a minimum.

We do not claim the simple arrangement of an intermediate ring or frame between the usual plates of a fifth-wheel, except such frame or ring be constructed as above described and held in place by the extension above and below the rollers of the rims D D', it being well known that fifth-wheels have been heretofore constructed containing an intermediate frame or ring; but these are secured in position either by connection with the king-bolt or by an arrangement of flanges on the upper and lower plates.

What we claim, and desire to secure by Letters Patent, is—

In a fifth-wheel, the upper plate, A, arranged to fit between the rims D D' of the intermediate frame, C, and bear upon the rollers $d$ thereof, and the lower plate, B, arranged to fit between the said rims D D' and support the said rollers $d$, in combination with said frame C, constructed as described, and for the purpose specified.

GEORGE W. BROWNE.
CALEB R. TURNER.

Witnesses:
NATHAN LEVENSON,
EDWIN A. PRATT.